United States Patent
Rovati

[15] 3,683,076
[45] Aug. 8, 1972

[54] PHARMACEUTICALLY ACTIVE GLUCOSAMINE SALTS USEFUL IN THE TREATMENT OF OSTEOARTHRITIS AND RHEUMATOID ARTHRITIS

[72] Inventor: Luigi Rovati, Via Valosa 2, S. Fruttuoso di Monza (Milan), Italy

[22] Filed: Oct. 14, 1969

[21] Appl. No.: 866,371

[30] Foreign Application Priority Data

Oct. 26, 1968 Italy ................... 53645 A/68

[52] U.S. Cl. ............................................. 424/180
[51] Int. Cl. ........................................... A61k 27/00
[58] Field of Search ..................................... 424/180

[56] References Cited

UNITED STATES PATENTS 3,008,874  11/1961  Feeney et al. ............. 424/233

OTHER PUBLICATIONS

Chem. Abst. 62, 1734e (1965).

*Primary Examiner*—Stanley J. Friedman
*Attorney*—Sughrue, Rothwell, Mion, Zinn & Macpeak

[57] ABSTRACT

Glucosamine sulphate and glucosamine hydroiodide are prepared pure by described processes for use in the treatment of arthritic disease.

11 Claims, No Drawings

PHARMACEUTICALLY ACTIVE GLUCOSAMINE SALTS USEFUL IN THE TREATMENT OF OSTEOARTHRITIS AND RHEUMATOID ARTHRITIS

The invention relates to the chemical synthesis, the preparation in pharmaceutical form and the therapeutic use of compounds capable of affecting calcium metabolism and that of cartilaginous tissue and hence also of acting on degenerative affections of the bones and joints.

The fact is that both diseases proper to the bones and arthriticorheumatic diseases causes variations in the calcium content of the bones.

If the calcium drops, there is osteoporosis, that is to say existence of vacuoles of various sizes within the bone wall: if the calcium increases, there is hyperostosis, that is to say a rise in the bone density.

These variations in the calcium metabolism are linked to those in the cartilaginous tissue and in the soft stroma of the bone, or metaphysarial stroma. In fact, the bone calcium metabolism is closely affected by that of this soft skeleton. This explains the variations in this ion in the course of arthritico-rheumatic diseases of the joints.

Again, calcium metabolism is directly concerned in bone fractures during the recovery period.

The compounds with which this invention is concerned are in fact indicated in the therapy of disturbances of the metabolism of the bone calcium and amino-sugars, being thought to have a direct action on both metabolisms.

The compounds in question are two salts of glucosamine, namely glucosamine sulphate and glucosamine hydroiodide.

The following description gives a commercial preparation of these compounds in a form having the degree of purity necessary to obtain the desired pharmacological results. The invention is not limited to the details of this description, being delineated broadly in the claims which follow.

GLUCOSAMINE SULPHATE

The present method for the commercial preparation of glucosamine sulphate is substantially different from those disclosed hitherto.

The previous methods are two:

1. Salt formation in the solid phase from glucosamine obtained beforehand from the hydrochloride.
2. The use of an ion-exchange resin in accordance with Italian Pat. application No. 19186 dated January, 18, 1963, by the present applicants (equivalents Germany R 35111 IVb/120 of Aug. 5, 1963 and U.S.A. 284,838 of Mar. 6, 1963.

The method of the invention differs completely from method (2) and differs from method (1) in these respects:

a. There is no need to have glucosamine in solid phase.
b. The slat formation takes place in homogenous phase (solution), and not in heterogeneous phase (suspension).
c. What is used is not 96 percent sulphuric acid, but fuming sulphuric acid containing 20 percent of sulphur trioxide.

The product differs in these respects:
a. It is far less hygroscopic:

|  | Duration | |
|---|---|---|
|  | In air | Enclosed |
| Glucosamine sulphate (old method) | 30 minutes | a few days |
| Glucosamine sulphate (new method) | 24 hours | unlimited | which represents a considerable improvement, both as regards greater controllability in the preparation of pharmaceuticals for oral administration and as an aspect of the pharmaceutical product itself.

b. It consists of the finest pure and practically anhydrous crystals, whereas previously it was composed of hydrated crystalline conglomerates, which gave it greater hydroscopicity.

The amounts of water have been measured by the Karl Fischer method on the two products, freshly prepared and dried:

Glucosamine sulphate (old method) — 7.2% $H_2O$
Glucosamine sulphate (new method) —0.5% $H_2O$

PREPARATION OF GLUCOSAMINE SULPHATE

A reaction vessel equipped with means for vigorous agitation and a cooling jacket or nest of tubes was charged with 35 liters of anhydrous methanol, to which was added, in small pieces, 700 g. of metallic sodium, steps being taken to prevent the temperature from exceeding 30° to 40° C. It is advisable for the vessel to be positioned below an extractor, for elimination of the hydrogen evolved.

To the sodium methanolate solution obtained, at a temperature of about 30°0 C., 6 kg. of glucosamine hydrochloride was added in a single batch, with vigorous agitation for 5 minutes. A drop in temperature was observed, due to endothermal reaction. A reaction time of 5 minutes represents the optimum; shorter times do not allow complete reaction, while longer times lead to a reduced yield, because of precipitation of glucosamine base in addition to sodium chloride.

At the end of the time stated, the resultant suspension was rapidly centrifuged to eliminate the sodium chloride.

The solution of glucosamine base in methanol (the filtrate) was put into a reaction vessel, cooled to 0° C. and to it was slowly added approximately 1 liter of fuming sulphuric acid containing 20 percent of sulphur trioxide.

The temperature should remain at 0° C.; lower or higher temperatures respectively slow the reaction or reduce the yield. The pH value must not fall below 2–3 if the product is not to be destroyed.

The additions of fuming sulphuric acid are stopped when it is found that the pH value no longer tends to rise again (a slight excess thus being added).

A 20 percent concentration of sulphur trioxide has been found to be best for the yield and quality of the product.

The additions having ceased, the suspension obtained was agitated, still at 0° C., for about an hour, and then 50 liters of acetone (ether or some other non-solvent is also suitable) was added.

Shorter or longer times result in varying degrees of granulation of the finished product.

The material was centrifuged and washed firstly with acetone and then with ether, what is required, in fact, being a solvent which evaporates very quickly, to avoid getting too hygroscopic a product.

The product was placed, as finely divided as possible and in as thin a layer as possible, into an oven already heated to 50° C. and in a current of air, and kept continuously in motion until completely dried.

Lower temperatures render the product more hygroscopic and higher temperatures darken it.

The best means of drying is a rotary vacuum drier, raised to 50° C.

The dry product was at once ground, being left in contact with air as little as possible, and then enclosed in small drums well insulated against moisture and protected with silica gel.

Production: 55 kg. (a yield of 86.4%0).
Standard: 99.4%.
Melting Point: 116° C.

GLUCOSAMINE HYDROIODIDE

The method of the invention for the commercial preparation of glucosamine hydroiodide differs in certain fundamental respects from methods disclosed hitherto.

The previous methods are two in number:
1. Salt formation in the solid phase from glucosamine obtained beforehand from the hydrochloride.
2. The use of an ion-exchange resin in accordance with the Italian Pat. application No. 19186 dated Jan. 18, 1963, by the present applicants already referred to.

The method in question is completely different from method (2) and differs from method (1) in these respects:
  a. Use of triethyl amine instead of diethyl amine for liberating the base.
  b. Far shorter reaction times.
  c. Different stoichiometric coefficients.
  d. Different reaction temperature.

The product differs from that obtained by method (1) in these respects:

|  | After 10 days | |
| --- | --- | --- |
|  | In air | Enclosed |
| Glucosamine hydroiodide (old method) | turns violet | darkens |
| Glucosamine hydroiodide (new method) | stays white | stays white |

The color changes in the product obtained by the old method are thought to be due to the fact that in crystallizing with water molecules there is catalysis of the oxidation of hydriodic acid to elementary iodine.

This is in conformity with the decrease of the concentration of the iodide ion.

The procedure is in two stages:
1. Preparation of the glucosamine.
2. Salt formation between the base and hydriodic acid.

PREPARATION OF THE GLUCOSAMINE

The ideal equipment for this type of reaction is a narrow, high, cylindrical vessel—ratio of base (diameter) to height: 7:11.

A vertical-bladed helical agitator is situated 10 mm. from the bottom of the vessel, covers it almost completely and is able to rotate at the optimum speed of about 1,000 revolutions per minute, to provide really good agitation of the composition formed.

This reaction vessel was charged with 7 liters of water, to which was added 15.4 kg. of glucosamine hydrochloride, reduced to powder beforehand. This powdering is essential; glucosamine hydrochloride that has not been properly ground will finally give a base still containing up to 50—60 percent of hydrochloride.

The addition and agitation must be so regulated, in this stage, as to avoid the formation on the walls of the vessel of product later found not to have reacted.

At this point, 11 liters of triethylamine were added to the suspension. Diethylamine will not do, because it evaporates too quickly; pyridine is too toxic and some traces may still remain. During the addition (which must be rapid) of the triethylamine, agitation was steadily increased, because the mixture becomes more and more doughy. The entire mass must be well agitated, as otherwise there will still be unreacted hydrochloride at the end.

Moreover, the temperature tends to rise, so that the use of cooling mixture is necessary. The temperature must not exceed 30° C., because above that temperature the glucosamine, in a basic environment, is destroyed; that can be seen directly, because the suspension, at first white, becomes more and more yellow.

Nor, however, may the temperature fall below 20° C., because then the suspension becomes too dense and can no longer be properly agitated; moreover, the speed of reaction drops too low. The suspension was agitated for 90 minutes in the above conditions.

At this point, the aim is to eliminate the triethylamine hydrochloride from the reaction mixture. For this, 15 liters of a 1:1 mixture of methanol and chloroform were used. If methanol alone be used, there are heavy losses, due to the high solubility in this of the glucosamine base. If chloroform alone be used, one obtains a gelatinous material that is difficult to filter and crystallize.

The ratio 1:1 has been found the best after much experiment. The 15 liters of the solvent mixture was added in a single batch and agitation was carried out for precisely 5 minutes.

Shorter times are not sufficient to eliminate the triethylamine hydrochloride properly. Longer times result in low yields, because of solubility.

The product was filtered and then washed again in 1:1 methanol/chloroform in small quantities until the triethylamine hydrochloride had been eliminated.

The product was arranged in a thin layer and dried at 40° C. in moving air. It is best to have at one's disposal a rotary vacuum drier.

Production: 11.2 kg. (a yield of 86.8%)
Glucosamine hydrochloride: 1.2%
Melting point: 117° C.

SALT FORMATION OF THE BASE WITH HYDRIODIC ACID

In this operation we used a reaction vessel equipped with a jacket and a nest of tubes through which very cold brine was circulated.

This equipment was charged with 20 liters of anhydrous acetone and 5 kg. of glucosamine was placed in suspension in this, agitation being applied.

The mixture was chilled to −10° C, though lower temperatures are also acceptable, because they do not slow the reaction unduly.

It is better to avoid higher temperatures, as they reduce the yield. At this point, 3.6 liters of 57 percent hydriodic acid were added very slowly, so as to keep the temperature at −10° C. and not to let the pH value drop below 3. When addition was complete, agitation was, as is desirable, continued for over an hour. Then 40 liters of acetone were added with continued agitation and the temperature was brought again to −10°C.

The mixture was filtered immediately (that is to say, at low temperature), and washed first with acetone and then with ether. It was then dried at 50° C. in moving air.

This gave 7 kg. of a white crystalline product, the yield being 82 percent.

Analysis showed:
Glucosamine: 100%       Iodides: 100%
Melting point: 197°C. − 198°C.

PHARMACOLOGICAL ACTION

The two salts concerned being difficult to keep, whether in suspension or in dry form, because they oxidize readily, formulae are given hereunder which can be recommended for the preparation of pharmaceutical forms, which, as will be observed, have as highly useful stabilizing constituents sodium hyposulphite or N-acetyl-diethanolamine in association with glucosamine hydrochloride.

Phials for intramuscular and intravenous use may be made up, for example, as under:

A) glucosamine sulphate        45 mg.
   glucosamine hydroiodide     25 mg.
   sodium hyposulphite         5 mg. per ml. of solution or B) glucosamine sulphate        45 mg.
   glucosamine hydroiodide     45 mg.
   sodium hyposulphite         9 mg. per ml. of solution.

The composition containing as stabilizer the N-acetyl-diethanolamine and glucosamine hydrochloride may be made up, for example, as under:

C) glucosamine sulphate        40 mg.
   glucosamine hydroiodide     40 mg.
   N-acetyl diethanolamine     4.4 mg.
   glucosamine hydrochloride   6 mg.

or alternatively at a concentration intermediate between those described, while respecting in general the proportions indicated.

In the same way, a formula for oral administration might be:

D) glucosamine sulphate        125 mg.
   glucosamine hydroiodide     125 mg.
   sodium hyposulphite         22 mg.

for a tablet or capsule or other suitable pharmaceutical form.

The medicament may also be administered in the form of suppositories having the following formula, for example:

E) glucosamine sulphate        200 mg.
   glucosamine hydroiodide     200 mg.
   sodium hyposulphite         40 mg.

The dosage recommended for human administration is 5–10 ml. per diem for compositions A, B and C by parenteral routes (intramuscular or intravenous in particular), from 2 to 4 times the stated dose before meals for D, and one or two suppositories per diem for E.

Demonstration of the therapeutic action of the compositions has been carried out on animals and on human beings.

Guinea pigs were used, in which a fracture of the radius was produced artificially. The action of the compositions was assessed as the "average time of cure" of the fracture, assessed in the first place radiologically and then histologically.

The animals were treated with 3 ml. of the product per kg. of body weight. The concentrations of the preparations used differed widely and these, together with the results obtained, are shown in table 1, in which "GS" and "GH" indicate the sulphate and hydroiodide respectively.

TABLE 1

| Controls | | Average time of cure in days |
|---|---|---|
| Controls | | 20 |
| GS/GH = | 1/1 | 12 |
| GS/GH = | 0.2/1 | 18 |
| GS/GH = | 1/0 | 22 |

The value 0 is that of control rats treated with physiological solution.

The numbers indicate the relative quantity of substance present.

In these cases, 1 = 40 mg./ml. (For example, "GS/GH = 0.2/1" should be read as "1 ml. of a solution contains 8 mg. of glucosamine sulphate and 40 mg. of glucosamine hydroiodide.")

The results obtained show that glucosamine sulphate and hydroiodide accelerate the cure of the experimental fractures and are more active if introduced in equal percentages, as in the compositions described above.

Conclusive test have been made on human beings, 36 subjects being chosen who suffered from bone and joint diseases such as osteoarthrosis and rheumatoid arthritis. The following factors were assessed:

a. Speed of erythrosedimentation (according to Katz's index). A rise in this above the normal denotes an inflammatory or infective disease.

b. Glucosamine in the blood. In arthritico-rheumatic affections, the level of glucosamine is raised by destruction of the stromatic bone tissue and cartilaginous tissue. A lowering of this denotes and improvement in the disease.

c. Calcium in the urine. In bone diseases, the calcium level rises with decalcification. A lowering of this indicates an improvement in the condition.

d. γ-globulins in the blood. These increase in ostearthroses and rheumatoid arthritis. A reduction brought about by a drug is indicative of intensive action.

The patients were divided into three groups, each treated with glucosamine sulphate and hydroiodide in different proportions.

The preparations were administered per os at a dosage of four tablets a day, two in the morning and two in the afternoon.

The composition of each tablet for the three groups was as follows:

(I) Ratio 1:1
GS 125 mg.
GH 125 mg.

(II) Ratio 1:2
GS 125 mg.
GH 250 mg.

(III) Ratio 1:0.2
GS 125 mg.
GH 25 mg.

The results obtained, summarized in table 2, bring out the fact that:

a. This form of therapy produces obvious improvement in the objective values measured. This improvement is also shown in the subjective symptomology by reduction or disappearance of pain and improved mobility.

b. The best results are obtained when the glucosamine sulphate and hydroiodide are in the ratio of 1:1, as in the formulae given above.

Administration by parenteral route produces similar results.

TABLE 2

| Duration of treatment Days | Katz value* II III | Glucosamine mg. % II III | Calcium in urine, mg.% II III | Globulins mg. % II III |
|---|---|---|---|---|
| 0 | 21.30 | 140 | 135 | 28.9 |
|   | 18.0 | 138 | 130 | 27.5 |
|   | 19.5 | 142 | 136 | 28.87 |
| 18 | 14.6 | 122 | 86 | 22.6 |
|   | 15.5 | 126 | 118 | 25.1 |
|   | 17.2 | 138.2 | 130 | 25.54 |
| 30 | 10.4 | 105 | 70 | 14.0 |
|   | 13.0 | 119 | 105 | 19.0 |
|   | 18.4 | 130.6 | 142 | 23.08 |
| Normal values: 10/11 |  | 84 | 70–80 | 11–12 |

* Speed of erythrosedimentation.

I, II and III are treatments with glucosamine sulphate and glucosamine hydroiodide in ratios of 1:1, 1:2 and 1:0.2 respectively.

I claim:

1. A pharmaceutical preparation for the treatment of osteoarthritis and rheumatoid arthritis, comprising as the active constituents thereof, an effective amount, in combination, glucosamine sulphate and glucosamine hydroiodide in equal proportions by weight.

2. The preparation of claim 1 wherein the weight ratio between the glucosamine sulphate and the glucosamine hydroiodide ranges from 1.0:2.0 to 1.0:0.2.

3. The preparation of claim 1 wherein the dosage of glucosamine sulphate and glucosamine hydroiodide respectively is 40 mg.

4. The preparation of claim 1 wherein the dosage of glucosamine sulphate and glucosamine hydroiodide respectively is 125 mg.

5. The preparation of claim 1 wherein the dosage of glucosamine sulphate and glucosamine hydroiodide respectively is 200 mg.

6. The preparation of claim 1 further comprising a stabilizer selected from the group consisting of sodium hyposulphite and N-acetyldiethanolamine.

7. A method for treating osteoarthritis and rheumatoid arthritis, which comprises administering to a patient infected with such malady, an effective amount of a mixture comprising, in combination, glucosamine sulphate and glucosamine hydroiodide in equal proportions by weight.

8. The method of claim 7 wherein the weight ratio between the glucosamine sulphate and glucosamine hydroiodide ranges from 1.0:2.0 to 1.0:0.2

9. The method of claim 7 wherein the dosage of glucosamine sulphate and glucosamine hydroiodide respectively is 40 mg.

10. The method of claim 7 wherein the dosage of glucosamine sulphate and glucosamine hydroiodide respectively is 125 mg.

11. The method of claim 7 wherein the dosage of glucosamine sulphate and glucosamine hydroiodide respectively is 200 mg.

* * * * *